INVENTOR
G. MINCHENKO
BY
S E Hollander
ATTORNEY

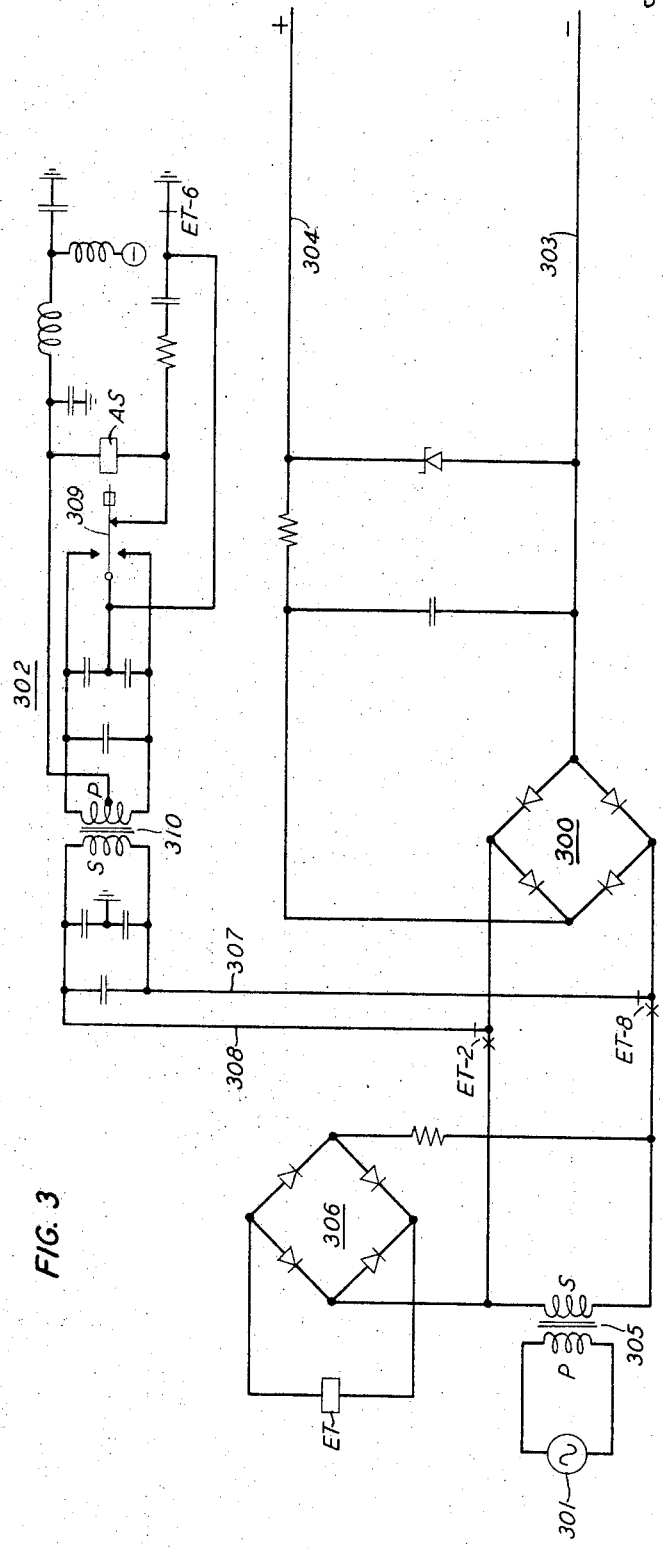

United States Patent Office 3,352,974
Patented Nov. 14, 1967

3,352,974
TRAFFIC LOAD DETECTING ARRANGEMENT
George Minchenko, Reynoldsburg, Ohio, assignor to Bell Telephone Laboratories, Incorporated, New York, N.Y., a corporation of New York
Filed Jan. 19, 1965, Ser. No. 426,562
11 Claims. (Cl. 179—8)

This invention relates to telephone systems and particularly to arrangements for sensing traffic loads in telephone systems.

More specifically, this invention relates to arrangements for detecting various levels of traffic load in telephone systems whereby remedial steps can be taken to minimize the effects of adverse traffic conditions.

Telephone systems are subjected to fluctuating traffic load conditions, and when heavy traffic is encountered it is often desirable to initiate actions to make equipment more readily available to meet the demands for service. The actual steps taken to control adverse traffic conditions will vary depending on the cause of the traffic overload and whether additional facilities can be made available.

An example of one such arrangement for controlling overloads in a network is disclosed in the copending application of P. J. Burke, K. D. Hopper and E. E. Schwenzfeger, Ser. No. 321,597, filed Nov. 5, 1963, now Patent No. 3,335,229. In the Burke et al. application a load sensing circuit monitored the number of trunks waiting for service by the common control equipment at a toll switching office, and when the number of trunks waiting exceeded a predetermined number indicating an impending overload, routing via the overloaded office was altered to relieve the congestion thereat.

While the load detector disclosed in the aforementioned Burke et al. application is suitable for its intended purpose, that detector and certain other known detectors lack facilities which I have incorporated in the instant invention.

For example, many of the known load sensing arrangements can only distinguish between two load conditions, that is a "no-overload" condition and an "overload" condition. While these arrangements are useful under certain circumstances it is often desirable to measure intermediate load conditions so that different traffic control measures can be instituted depending on the severity of the overload.

It is therefore an object of my invention to provide load detecting arrangements sensitive to a plurality of different load conditions.

Load detectors in the prior art have taken many forms. For instance, some arrangements use relays or vacuum tubes that can be marginally adjusted to operate at different circuit conditions which indicate when a predetermined number of units of equipment are in use. These circuits, however, have inherent limitations due to the difficulty of maintaining the marginal devices adjusted. In addition, these marginal devices are generally only responsive within a limited range, and it is difficult to adjust these devices to detect different levels of traffic load.

It is therefore a further object of my invention to improve the load indicating devices by making them adjustable over a wide range of loads and yet sensitive to circuit changes which indicate various levels of traffic load within a given range.

In accordance with the disclosed embodiment of the present invention, an impedance bridge circuit and two transistor trigger circuits are used to measure different levels of traffic load in a telephone system. For the purpose of this description the term "traffic load" describes the quantity of calls a particular telephone system is handling at a given time, and this can be measured by observing the units of equipment that are simultaneously in use. The type of equipment to be observed, of course, will depend on the switching system under surveillance, and as is well known in the prior art arrangements, trunks, senders, etc. form a typical source for deriving traffic load measurements.

Briefly, the bridge circuit of the disclosed arrangement comprises two fixed impedance arms and two variable impedance arms. One of the variable arms is coupled to the equipment being monitored and has an impedance valve corresponding to the number of units of equipment that are simultaneously in use. The trigger circuits are selectively coupled to the bridge to detect bridge imbalance at various traffic loads.

For purposes of illustration the various load conditions to be detected have been designated as (1) "no-overload," (2) "low overload" and (3) "high-overload." More specifically the "no-overload" condition represents a level of traffic at which the particular telephone system can operate efficiently without rejecting additional calls, while the "low-overload" condition represents a traffic load situation which presents no immediate danger to the system but may require some minor corrective action to prevent the overload situation from intensifying. The "high-overload" condition, on the other hand, might represent a traffic situation which requires immediate corrective action to forestall systemwide congestion. It will be realized that these load designations have been arbitrarily selected for discussion purposes only to aid the reader in appreciating the scope and problems solved by my invention and are not intended to be limiting.

When the present system is operating under normal or "no-overload" traffic conditions, the first trigger is coupled to the bridge. As the traffic load increases to the point where a sufficient number of units of equipment are busy to present a "low-overload" condition, the impedance bridge is unbalanced and the first trigger operates to signal a traffic control circuit to take corrective steps to reduce the load. In addition, the first trigger actuates control circuitry to alter the other variable arm of the bridge while alternately connecting each of the triggers to the bridge to sample for imbalance at the "low-overload" and the "high-overload" levels of traffic.

The sampling continues until the circuit returns to normal when a "no-overload" is detected by the release of the first trigger, or until the second trigger operates indicating a 'high-overload" traffic condition. At the "high-overload" condition another signal is sent to the traffic control circuitry so that additional corrective steps may be taken to avoid further traffic congestion.

Having briefly described the invention, a better understanding of the arrangement contemplated may be had by a perusal of the following detailed description in conjunction with the one illustrative embodiment of the invention depicted in the drawing in which:

FIG. 3 shows the power supply for the load sensing arrangement; and

FIG. 4 shows the arrangement of FIGS. 1 through 3.

*Arrangement of equipment*

Figure 1:
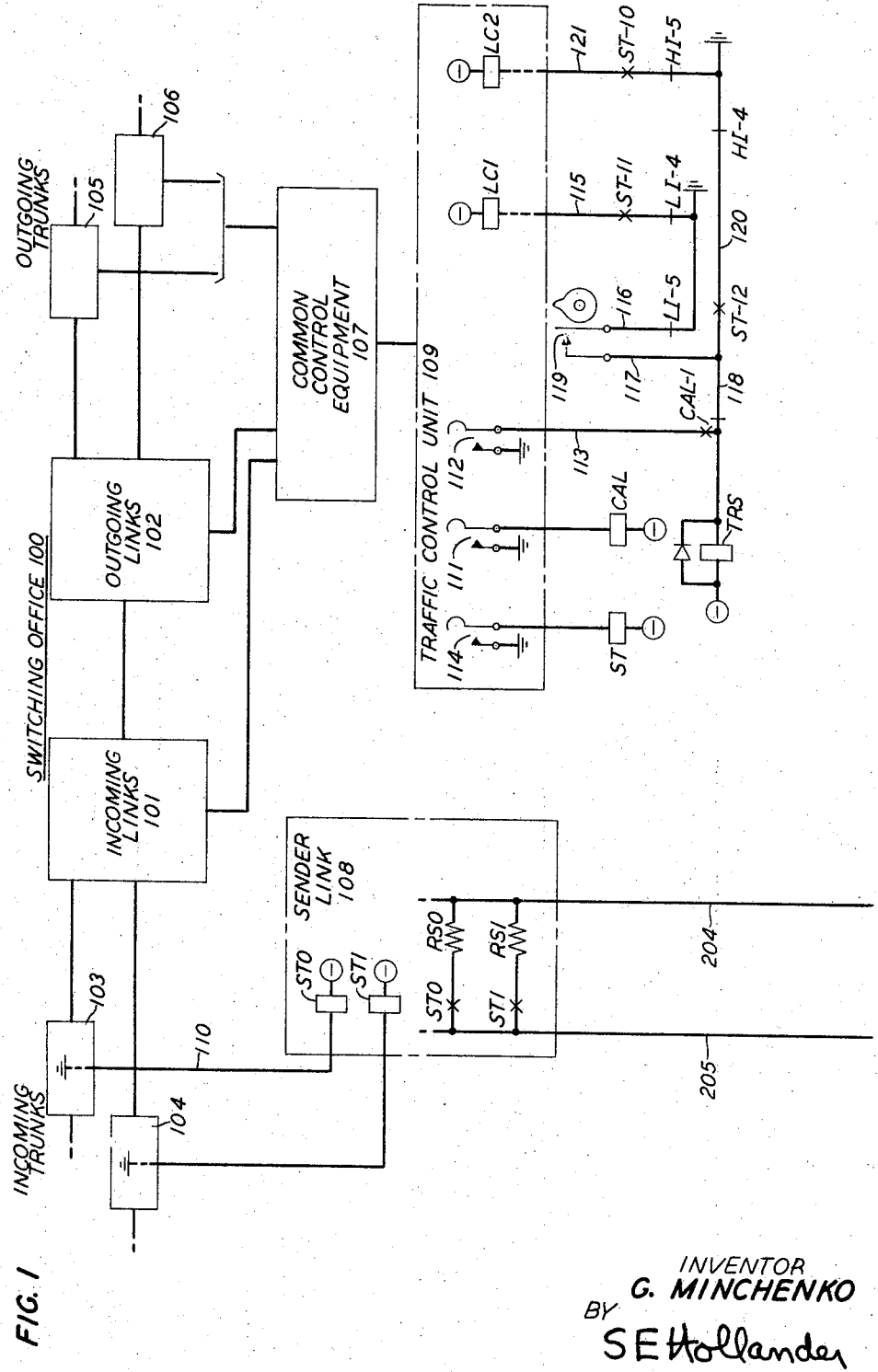
FIG. 1 shows a telephone switching office including switching equipment to be monitored for ascertaining traffic loads at the office and a traffic control unit for controlling the switching equipment.

Turning first to FIG. 1, there is shown in block diagram form a typical telephone switching office 100 comprising incoming links 101, on which trunks incoming from other offices appear, outgoing links 102, on which trunks outgoing to other offices appear, and common control equipment 107 for establishing connections between the trunks on links 101 and 102. For simplicity, only trunks 103–106 have been shown, and it will be understood that switching office 100 can serve many other trunks.

Switching office 100 can be any one of the many well-known types of telephone switching systems. An example of one such system is disclosed in Patent 2,868,884 to J. W. Gooderham et al. of Jan. 13, 1959, and the Gooderham et al. patent is hereby incorporated by reference as though fully disclosed herein.

Also shown in FIG. 1 is sender link 108 and traffic control unit 109. Sender link 108 is responsive to signals from incoming trunks 103 and 104 for requesting service by common control equipment 107. More specifically, in the switching system being described the incoming trunks are divided into groups each having a group start relay (ST–). Trunk 103 bids for service by common control equipment 107 by signaling over conductor 110 to operate group start relay STO. It can, therefore, be seen that by monitoring the number of group start relays which are operated, the number of incoming trunks simultaneously waiting for service can be determined thereby indicating the level of traffic load at switching office 100. Of course, other equipment can be monitored to measure the traffic load at a switching office, and the type of equipment to be monitored for a particular office can be ascertained using any of the well-known traffic measuring techniques.

Figure 2:
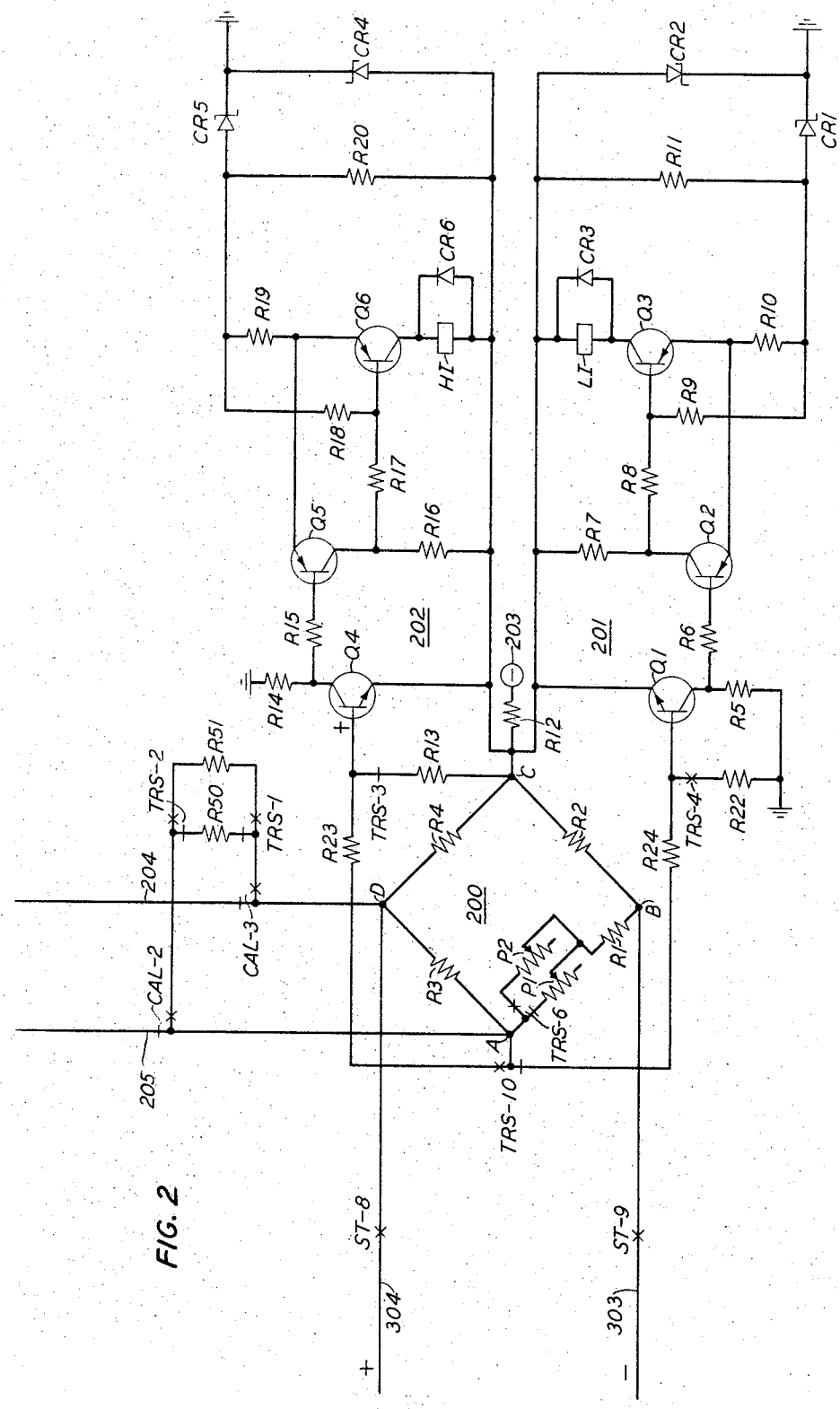
FIG. 2 shows an impedance bridge and the load sensing arrangement for detecting different levels of traffic load at the switching office in FIG. 1.

Traffic control unit 109 in FIG. 1 is responsive to signals from load detectors in FIG. 2 for controlling the common equipment 107 in accordance with the various traffic conditions being encountered. While the details of the traffic control circuit have not been shown in FIG. 1, it will be understood that traffic control unit 109 might control the holding time of equipment such as senders and markers at office 100, or unit 109 might control the routing of calls thereat or at some distant office in accordance with arrangements such as those disclosed in the aforementioned P. J. Burke et al. application.

Turning now to FIG. 2 there is shown one illustrative embodiment of the arrangement for detecting various traffic load conditions at switching office 100 in FIG. 1. More specifically, FIG. 2 shows an impedance bridge 200 and transistor trigger circuits 201 and 202 for detecting "no-overloads," "low-overloads" and "high-overloads." Impedance bridge 200 comprises two fixed impedance ratio arms CD and BC and two variable impedance arms. Of the variable arms, arm AD includes resistance R3 in FIG. 2 and resistances RS0, RS1, etc. in FIG. 1, while the other variable arm AB comprises resistance R1 and potentiometer P1 or P2. Transistor triggers 201 and 202 include "low-overload" and "high-overload" indicating relays LI and HI, respectively, and will be described in more detail below.

FIG. 3 depicts the power supply circuit for the arrangement including rectifier 300 which is supplied from commercial power supply 301, or the emergency standby power supply 302.

*Detailed description*

In each of the figures of the drawing the relays have been given letter designations representative of their functional characteristics. On the other hand, the contacts of the relays have been given a numerical designation preceded by a hyphen and the letter designation for that relay which actuates the particular set of contacts. For example, the first set of contacts for calibrate relay CAL are designated CAL–1.

As the monitored circuits in FIG. 1 are seized, resistances RS– are added in parallel with resistance R3 in arm AD of the bridge 200 thus making the potential at point A more positive than the potential at point C. When the bridge becomes sufficiently unbalanced one of the triggers 201 or 202 is actuated to release its corresponding relay LI or HI to actuate the traffic control unit 109 in FIG. 1 in the appropriate manner.

However, prior to connecting the detector circuitry to the monitored equipment in FIG. 1 the triggers 201 and 202 must be adjusted to operate at preselected thresholds so that the desired load conditions can be detected.

To calibrate the arrangement, calibrate switch 111 in FIG. 1 is actuated to operate relay CAL over an obvious operating circuit. In operating, relay CAL actuates its contacts CAL–2 and CAL–3 in FIG. 2 disconnecting ratio arm AD from the monitored circuits in FIG. 1 and connecting reference resistance R50 in parallel with arm AD. Resistance R50 has been selected to simulate an equivalent number of RS– resistances in parallel thereby representing a first predetermined number of trunks waiting for service hereinafter referred to as the "low-overload" traffic condition.

After calibrate switch 111 is operated start key 114 is actuated to operate relay ST in FIG. 1, and relay ST operates its contacts ST–8 and ST–9 (FIG. 2) to connect the voltage supply of FIG. 3 across the BD diagonal of bridge circuit 200.

With reference resistance 50 connected across arm AD, bridge 200 can be balanced to actuate trigger circuit 201 at a particular threshold value by adjusting potentiometer P1. It will be noted that the base-emitter junction of transistor amplifier Q1 is connected across diagonal AC of bridge circuit 200. Whenever the resistance of arm AD exceeds the resistance of arm AB the potential at point A is negative with respect to the potential at point C. This voltage condition reverse biases the base-emitter junction of transistor Q1, and Q1 is cut off. With transistor Q1 cut off there is an insufficient voltage drop across resistance R5 to turn on transistor Q2, and with transistor Q2 cut off, transistor Q3 is saturated. When transistor Q3 is conducting a circuit is completed from negative source 203, through resistance R12, the winding of relay LI, transistor Q3, resistance R10 and diode CR1 to ground, operating relay LI.

The resistance of arm AB can now be adjusted by potentiometer P1 until "low-overload" indicating relay LI just operates.

Having adjusted potentiometer P1 so that transistor Q1 will be triggered on when the resistance across arm AD is slightly less than the reference resistance R50, a similar calibration can be made with respect to trigger circuit 202.

To couple trigger circuit 202 to bridge 200, transfer key 112 in FIG. 1 is operated extending ground over conductor 113, through operated contacts CAL–1 and through the winding of relay TRS to battery, operating relay TRS.

In operating, relay TRS actuates its contacts TRS–10 in FIG. 2 disconnecting the base of transistor Q1 (trigger circuit 201) from point A of the bridge and connecting to point A the base of transistor amplifier Q4 (trigger circuit 202). In addition, contacts TRS–1 and TRS–2 disconnect reference resistance R50 from arm AD and connect reference resistance R51 thereto. Resistance R51 is equivalent to a second predetermined traffic load condition hereinafter referred to as the "high-overload" condition.

At its contacts TRS–6, relay TRS replaces potentiometer P1 with potentiometer P2 in the arm AB of the bridge 200, and the bridge can now be balanced at a threshold determined by reference resistance R51 and potentiometer P2. Potentiometer P2 is now adjusted so that "high-overload" indicating relay HI just operates.

It will be noted that by using different values of reference resistance in arm AD and by adjusting potentiometers P1 and P2 accordingly, triggers 201 and 202 can be set to operate over different ranges of traffic load, and within any selected range, the triggers remain sensitive to relatively small changes in the balance of bridge 200.

Having adjusted both potentiometers P1 and P2 so that transistor amplifiers Q1 and Q4 will be triggered at predetermined threshold values, the circuit can now be coupled to the telephone equipment which is to be monitored. This is accomplished by restoring to normal calibrate key 111 and transfer key 112 in FIG. 1. Key 112, in restoring to normal, interrupts the operating circuit for transfer relay TRS which releases, and calibrate key 111, in restoring to normal, releases relay CAL.

In releasing, relay CAL disconnects reference resistances R50 and R51 from arm AD of bridge 200, and connects that arm over conductors 204 and 205 to the circuits to be monitored at sender link 108 in FIG. 1. The balance of the bridge will now be determined by the resistance of arm AD which is altered in accordance with the number of units of equipment in FIG. 1 that are simultaneously held busy, and in this specific embodiment the equipment units insert resistances RS- in parallel with arm AD as the units are taken for service.

Let it be assumed that the switching office 100 is experiencing a normal traffic load and relatively few trunks are waiting for service by common control equipment 107. Under these circumstances a minimum number of ST- relays will be operated in sender link 108, and the resistance across arm AD of bridge 200 would be relatively high. With arm AD having a higher resistance than arm AB (including potentiometer P1) the transistor amplifier Q1 normally connected to the bridge is back-biased and turned off. Transistor amplifier Q4 is also cut off, and with both transistors Q1 and Q4 off, transistors Q2 and Q5 are also turned off permitting transistors Q3 and Q6 to conduct. Transistors Q3 and Q6 in conducting complete operating circuits for "low-overload" and "high-overload" indicating relays LI and HI, respectively. In other words, when switching office 100 is experiencing a "no-overload" traffic condition, both relays LI and HI are operated, and no signals are being sent to traffic control unit 109.

As switching office 100 begins to serve more traffic, more incoming trunks such as 103 and 104 will be waiting for service by common control equipment 107. While these trunks are waiting for service, corresponding relays ST- will be operated, and each relay ST- inserts a resistance RS- in parallel with arm AD of bridge 200. When a sufficient number of trunks equivalent to a "low-overload" condition are simultaneously waiting, the resistance across arm AD becomes less than the resistance of arm AB (including potentiometer P1), and the bridge becomes unbalanced at the first threshold level. Point A now becomes more positive with respect to point C, and transistor Q1 conducts.

In conducting, transistor Q1 causes a sufficient voltage drop across resistance R5 so that transistor Q2 is turned on driving the base of transistor Q3 more positive and cutting off transistor Q3. When transistor Q3 is in its high impedance cutoff state, insufficient current flows through the winding of relay LI and "low-overload" indicating relay LI releases.

In releasing, relay LI closes it contacts LI-4 in FIG. 1 to extend ground through operated contacts ST-11 and over conductor 115 to operate load control relay LC1 in traffic control unit 109. Load control relay LC1 will now initiate corrective action to prevent the overload condition at switching office 100 from increasing.

This corrective action might include reducing the equipment holding time of common equipment such as senders, markers, etc. at switching office 100, or load control relay LC1 might transmit signals to other offices requesting that they reroute traffic to bypass switching office 100 until the overload subsides.

Relay LI, in releasing, also extends ground through its contacts LI-5, over conductor 116, through interrupter contacts 119, over conductors 117 and 118, through normal contacts CAL-1 and through the winding of transfer relay TRS to battery to intermittently operate relay TRS.

TRS will operate and release each time the contacts of interrupter 119 are closed and opened, respectively, to alternately connect trigger circuits 202 and 201 to bridge 200 to sample for "high-overload" and "low-overload" traffic conditions. More specifically, when relay TRS is released normal contacts TRS-10 connect the base of transistor Q1 (trigger circuit 201) and normal contacts TRS-6 connect potentiometer P1 to point A of bridge 200 for detecting a change from "no-overload" to "low-overload." On the other hand, when relay TRS is operated the base of transistor Q4 (trigger circuit 202) and potentiometer P2 are connected to point A of the bridge to detect a change from "low-overload" to "high-overload."

Relay TRS in its operated condition also connects through its contacts TRS-4 the base of transistor Q1 to ground maintaining transistor Q1 in a state of condition while the circuit is sampling for a "high-overload" condition. Similarly when relay TRS is released, contacts TRS-3 maintain the base of transistor Q4 sufficiently negative to hold transistor Q4 cut off while sampling for the "no-overload" and "low-overload" conditions.

From this point the relay TRS will continue to alternately connect trigger circuits 201 and 202 to the bridge to sample for "no-overload," "low-overload" and "high-overload" conditions until the traffic load changes.

Let it now be assumed that the traffic load continues to increase further decreasing the resistance across arm AD so that when relay TRS is operated connecting potentiometer P2 and the base of transistor Q4 to point A, the bridge is sufficiently unbalanced to turn on transistor Q4. When transistor Q4 conducts the voltage drop across resistance R14 makes the base of transistor Q5 sufficiently negative so that transistor Q5 conducts, turning off transistor Q6. Transistor Q6, in turning off, releases relay HI in the collector circuit of that transistor, and relay HI, in releasing, connects ground through its contacts HI-4 in FIG. 1, over conductor 120, through contacts ST-12, over conductor 118, in parallel with the ground through interrupter contacts 119 to hold relay TRS operated independently of the interrupter circuit. With relay TRS held operated by released relay HI, the sampling for "low-overload" stops, and trigger 202 is maintained connected to the bridge.

Relay HI, in releasing, also connects ground through its contacts HI-5, through contacts ST-10 and over conductor 121 to operate load control relay LC2 in traffic control unit 109. Load control relay LC2 causes additional traffic control measures to be instituted to prevent the overload at switching center 100 from increasing.

The load sensing arrangement will stay in its present state with both indicating relays LI and HI released until the traffic load at switching office 100 begins to diminish.

As the traffic load decreases to a point where the resistance across arm AD is greater than the resistance of arm AB (including potentiometer P2) transistor Q4 is once again back-biased to cutoff. With transistor Q4 cut off, transistor Q5 is also cut off permitting transistor Q6 to conduct and reoperate relay HI. When relay HI reoperates, the "high-overload" indication on conductor 121 to traffic control until 109 is removed releasing relay LC2, and the ground is also removed from conductor 120. It will be recalled that the ground on conductor 120 held relay TRS steadily operated, and when this ground is removed the ground through interrupter contacts 119 is once again effective to intermittently operate relay TRS.

With relay TRS now intermittently operating and releasing, trigger 202 and trigger 201 are alternately connected to the bridge, while the corresponding potentiometers P2 and P1 are inserted in arm AB of the bridge to sample for "high-overload" and "low-overload" conditions.

If the load at switching office 100 should continue to decrease to a point where the bridge 200 is once again balanced when trigger 201 and potentiometer P1 are coupled thereto, transistor Q1 will be turned off driving the base of transistor Q2 positive and turning transistor Q2 off. With transistor Q2 off, transistor Q3 conducts to reoperate relay LI.

When relay LI reoperates the "low-overload" indication on conductor 115 to traffic control unit 109 is removed restoring the control circuitry therein to normal. Relay LI, in releasing, also removes the ground from the intermittent operating circuit for relay TRS, and relay TRS releases. With relay TRS continuously released transistor Q1 for trigger 201 is maintained connected across bridge 200 to detect an overload condition should the traffic at switching office 100 begin to increase.

Thus it can be seen from the foregoing description that triggers 201 and 202 hold relays LI and HI operated during a "no-overload" traffic condition, and when the traffic increases beyond a predetermined amount, "low-overload" trigger 201 is actuated to release relay LI. In releasing, relay LI causes the triggers 201 and 202 to be alternately connected to the bridge to sample for both "low-overload" and "high-overload" traffic conditions. The sampling is continued until the traffic decreases as determined by release of trigger 201 and the reoperation of relay LI, or until traffic increases to a point where trigger 202 is actuated to release relay HI.

Turning now to FIG. 3 a brief description of the power supply depicted therein will now be given.

The power supply in FIG. 3 comprises a full wave rectifier 300 which is connected through transformer 305 to alternating-current source 301. It is through rectifier 300 that a direct-current potential is supplied over conductors 303 and 304 to sensing bridge 200 in FIG. 2. It will be noted that the alternating-current from commercial source 301 is connected to rectifier 300 via operated contacts ET-2 and ET-8 of relay ET. Relay ET is normally held operated by the output of rectifier 306 which is also fed by the commercial power supply 301. As long as the commercial power is available, relay ET will be held operated to connect the commercial source 301 to rectifier 300 thereby furnishing a potential source for the sensing bridge 200 in FIG. 2.

If for any reason the commercial power source 301 should fail, emergency transfer relay ET would release coupling the output of emergency alternator 302 over conductors 307 and 308 to rectifier 300.

Emergency alternator 302 comprises a self-interrupting circuit including relay AS which is under control of contacts ET-6 of relay ET. As armature 309 vibrates ground potential is alternately connected to the upper and lower terminals of the primary winding of transformer 310. The output of transformer 310 is coupled over conductors 307 and 308 to rectifier 300 in place of the commercial power supply 301.

It is to be understood that the above-described arrangements are merely illustrative of the application of the principles of the invention. Numerous other arrangements may be devised by those skilled in the art without departing from the spirit and scope of the invention.

What is claimed is:

1. In a telephone system, a plurality of telephone circuits, control equipment for establishing connections to said circuits, and detector means for ascertaining the availability of said circuits, said detector means comprising an impedance bridge including an impedance arm, means controlled by said telephone circuits for causing said arm to have different impedance values when different numbers of said circuits are available for connection, first trigger means operative in response to bridge imbalance when said arm has an impedance value representing a first predetermined number of available circuits for transmitting a first signal to said control equipment, second trigger means, and means effective when said first trigger means is operated for intermittently connecting said second trigger means to said bridge to detect an impedance value representing a different predetermined number of available circuits, said second trigger means effective when operated for transmitting a second signal to said control equipment.

2. A traffic load detector circuit for a telephone system comprising a bridge circuit including first and second impedance arms, first and second trigger means responsive to the imbalance of said bridge circuit, and control means responsive to traffic load conditions for causing the load detector circuit to operate in three distinct ranges, said control means including means for establishing in said first arm different values of impedance for different levels of traffic load, means for connecting said first trigger means to detect a first impedance value representing a traffic load below a first level and said second trigger means to detect a second impedance value representing a traffic load above a second level, and means for detecting load conditions between said first and second levels comprising means for altering said second impedance arm while alternately connecting said trigger means to said bridge circuit.

3. An arrangement for ascertaining the occupancy of units of equipment comprising a bridge circuit including first and second variable impedance arms, means controlled by said equipment for changing the impedance of said first arm in accordance with the number of occupied equipment units, first trigger circuit means actuated in response to bridge imbalance as determined by a first arm impedance change representing a first predetermined number of occupied equipment units, second trigger circuit means actuated in response to bridge imbalance as determined by a first arm impedance change representing a second predetermined number of occupied equipment units, and control means effective when said first trigger circuit means is actuated for alternately connecting said first and second trigger circuit means to said bridge.

4. The invention defined in claim 3 wherein said control means includes means for maintaining said first trigger circuit means actuated when only said second trigger circuit means is connected to said bridge and means for maintaining said second trigger circuit means unactuated when only said first trigger circuit means is connected to said bridge.

5. The invention defined in claim 3 wherein is further provided means effective when said second trigger circuit means is actuated for disabling said control means to maintain said second trigger circuit means continuously coupled to said bridge.

6. The invention defined in claim 4 wherein each said trigger circuit means comprises a first transistor having its base connectable to said bridge for detecting bridge imbalance and wherein said maintaining means includes means for applying biasing potentials to said bases independently of said bridge.

7. A traffic load sensing device for a telephone system comprising a bridge circuit including first and second variable impedance arms, means for causing said first arm to have different impedance values for different levels of traffic load, a plurality of trigger means each including an impedance connectable to said second arm and detecting means for determining bridge imbalance as indicated by the relative impedance values of said first and second arms, and means for sampling different levels of traffic load including means for successively connecting each said trigger means to detect bridge imbalance.

8. A traffic load detector circuit for telephone systems comprising an impedance bridge including first and second variable arms, first and second trigger means responsive to bridge imbalance, control means responsive to traffic load conditions for causing said load detector to be operated in three distinct ranges, said control means including means for establishing in said first arm different values of impedance for different load conditions, first and second reference impedances, means for connecting said first trigger means to said bridge and said first reference impedance to said second arm for detecting traffic load in a first range below a first predetermined level, and transfer means effective when said first trigger means is actuated in response to traffic load in a second range above said first level for intermittently disconnecting said first trigger means and said first reference impedance and connecting said second trigger means to said bridge and said second reference impedance to said second arm for alternately detecting traffic loads in said second range and in a third range above a second predetermined level.

9. The invention defined in claim 8 wherein said control means further includes means for maintaining said first trigger means actuated when said first trigger means is disconnected from said bridge.

10. The invention defined in claim 9 wherein each said trigger means comprises a transistor amplifier responsive to said bridge imbalance, a transistor trigger circuit actuated by said amplifier and a detecting relay governed by said trigger circuit, wherein said transfer means comprises an interrupter circuit and a transfer relay intermittently operated by said first trigger means detecting relay and said interrupter, said transfer relay including means for alternately connecting the transistor amplifiers for each said trigger means to said bridge, and wherein said second trigger means detecting relay includes means for operating said transfer relay independently of said interrupter circuit.

11. An arrangement for ascertaining the occupancy of units of equipment comprising an impedance network, means controlled by said equipment for changing the impedance of said network in accordance with the number of occupied equipment units, a first trigger circuit operated in response to a first impedance change in said network when a first predetermined number of said units are occupied, a second trigger circuit operated in response to a second impedance change in said network when a second predetermined number of said units are occupied, and control means effective when said first trigger circuit is operated in response to said first impedance change for alternately connecting said first and second trigger circuits to said network.

References Cited
UNITED STATES PATENTS 2,024,275  12/1935  Clark _____ 179—8.6

KATHLEEN H. CLAFFY, *Primary Examiner.*

H. ZELLER, *Assistant Examiner.*